(12) United States Patent
Honda et al.

(10) Patent No.: US 7,269,496 B2
(45) Date of Patent: Sep. 11, 2007

(54) FUEL INJECTION CONTROL APPARATUS FOR DIRECT INJECTION TYPE INTERNAL COMBUSTION ENGINE

(75) Inventors: Koji Honda, Toyota (JP); Masahiko Teraoka, Toyota (JP); Masanao Idogawa, Toyota (JP); Seiji Hirowatari, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/303,949

(22) Filed: Dec. 19, 2005

(65) Prior Publication Data

US 2006/0142923 A1  Jun. 29, 2006

(30) Foreign Application Priority Data

Dec. 27, 2004 (JP) .............................. 2004-377308

(51) Int. Cl.
*F02D 41/38* (2006.01)

(52) U.S. Cl. ............... 701/104; 123/73 AD; 123/196 R

(58) Field of Classification Search ................ 701/102, 701/103, 104, 115; 123/73 AD, 495, 515, 123/526, 196 S, 196 R; 184/1.5, 6.4, 6.21
See application file for complete search history.

(56) References Cited

U.S. PATENT DOCUMENTS

| | | | |
|---|---|---|---|
| 6,591,817 B2 * | 7/2003 | Deutsch | 123/525 |
| 6,739,320 B2 | 5/2004 | Ito et al. | |
| 6,810,858 B2 * | 11/2004 | Ito et al. | 123/478 |
| 6,856,889 B2 | 2/2005 | Nagaishi et al. | |
| 6,990,968 B2 | 1/2006 | Nagaishi et al. | |
| 2003/0200958 A1 | 10/2003 | Yukikazu et al. | |
| 2004/0099252 A1 | 5/2004 | Nagaishi et al. | |
| 2005/0137779 A1 * | 6/2005 | Gioannini et al. | 701/103 |

FOREIGN PATENT DOCUMENTS

| | | |
|---|---|---|
| EP | 1 357 280 A2 | 10/2003 |
| EP | 1 361 354 A2 | 11/2003 |
| JP | H2-67442 A | 3/1990 |
| JP | H9-42077 A | 2/1997 |
| JP | H10-103138 A | 4/1998 |
| JP | A 10-317936 | 12/1998 |
| JP | 2003-322047 A | 11/2003 |
| JP | A 2003-322044 | 11/2003 |
| JP | A 2004-137953 | 5/2004 |

OTHER PUBLICATIONS

U.S. Appl. No. 11/303,963, Dec. 19, 2005, Honda et al.

* cited by examiner

*Primary Examiner*—Willis R. Wolfe
*Assistant Examiner*—Johnny H. Hoang
(74) *Attorney, Agent, or Firm*—Oliff & Berridge, PLC

(57) ABSTRACT

A fuel injection control apparatus for a direct injection type internal combustion engine according to the invention includes a control unit. The control unit estimates the degree to which lubricating oil, which is used in the internal combustion engine, has been diluted with fuel based on the length of time the internal combustion engine has been running, and an accumulated value that indicates an amount of air that has been taken in by the internal combustion engine while the internal combustion engine has been running or an accumulated value that indicates an amount of fuel that has been injected while the internal combustion engine has been running. The control unit determines the amount of fuel to be injected based on the degree of dilution.

11 Claims, 11 Drawing Sheets

FIG.4

| AFTER-ENGINE-START ELAPSED TIME TA | ... | | | | | |
|---|---|---|---|---|---|---|
| | TA6 | | | | | |
| | TA5 | | DILUTION FUEL INCREASE AMOUNT ΔFD | | | |
| | TA4 | | | | | |
| | TA3 | | | | | |
| | TA2 | | | | | |
| | TA1 | | | | | |
| | | GA1 | GA2 | GA3 | GA4 | ... |
| | INTAKE AIR AMOUNT ACCUMULATED VALUE GAT | | | | | |

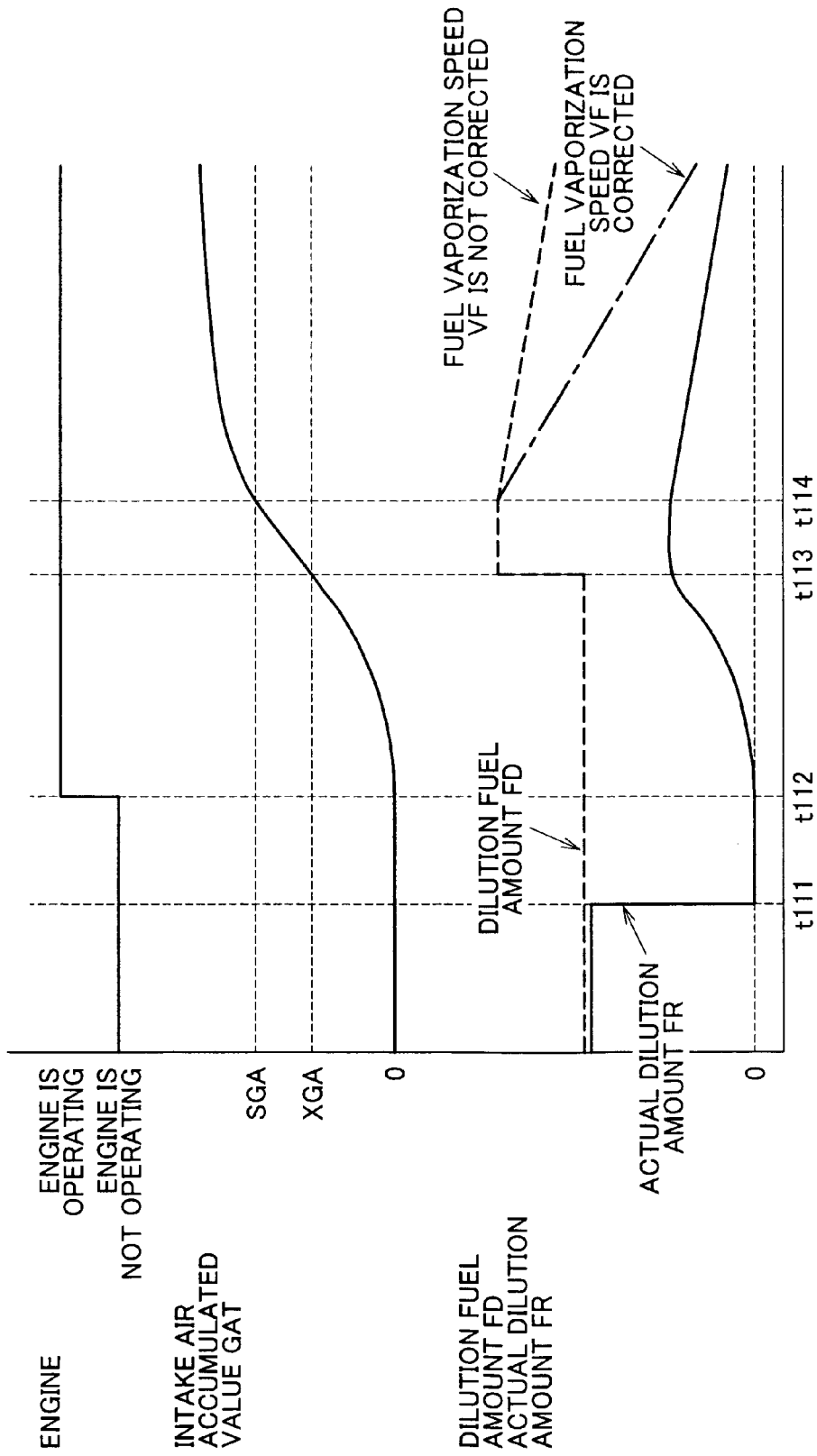

FUEL INJECTION CONTROL APPARATUS FOR DIRECT INJECTION TYPE INTERNAL COMBUSTION ENGINE

INCORPORATION BY REFERENCE

The disclosure of Japanese Patent Application No. 2004-377308 filed on Dec. 27, 2004 including the specification, drawings and abstract is incorporated herein by reference in its entirety.

BACKGROUND OF THE INVENTION

1. Field of the Invention

The invention relates to a fuel injection control apparatus for a direct injection type internal combustion engine in which fuel is injected directly into the combustion chamber.

2. Description of the Related Art

In a direct injection type internal combustion engine, if the fuel injected from an injector is not sufficiently atomized, a large amount of fuel adheres to the inner surface of the cylinder, and the fuel is mixed into lubricating oil. As a result, the lubricating oil is diluted with the fuel, also known as "fuel dilution".

Therefore, fuel injection control apparatuses that estimate the degree of such fuel dilution have been proposed. For example, Japanese Patent Application Publication No. 2003-322044 A discloses a fuel injection control apparatus which estimates that the degree of fuel dilution has increased, when an accumulated value such as an intake air amount accumulated value, which indicates an amount of air taken in an internal combustion engine from the time the internal combustion engine starts until it stops, is equal to or less than a reference value.

Dilution of lubricating oil with fuel greatly influences the amount of fuel supplied to the combustion chamber. Accordingly, the degree to which lubricating oil has been diluted with the fuel needs to be estimated accurately, and the estimated degree of dilution needs to be taken into account when the fuel injection control is performed.

The fuel injection control apparatus disclosed in Japanese Patent Application Publication No. 2003-322044 A estimates the degree of fuel dilution based only on the intake air amount accumulated value. With such a fuel injection control apparatus, it is difficult to obtain estimated results having sufficiently high accuracy.

SUMMARY OF THE INVENTION

A fuel injection control apparatus for a direct injection type internal combustion engine according to a first aspect of the invention includes a control unit. The control unit estimates the degree to which lubricating oil, which is used in the internal combustion engine, has been diluted with fuel, based on the length of time the internal combustion engine has been running; and the accumulated value that indicates the amount of air that has been taken in by the internal combustion engine (hereinafter, referred to as the "intake air amount") while the internal combustion engine has been running or the accumulated value that indicates the amount of fuel that has been injected (hereinafter, referred to as the "fuel injection amount") while the internal combustion engine has been running. The control unit controls fuel injection based on the degree of fuel dilution.

The degree of fuel dilution changes based on the temperature of a cylinder, as well as the length of time the internal combustion engine has been running. According to the first aspect, the degree of fuel dilution can be accurately estimated based on the above-mentioned length of time in addition to the accumulated value of the intake air amount or the accumulated value of the fuel injection amount correlated with the temperature of the cylinder, as the parameter for estimating the degree of fuel dilution.

A fuel injection control apparatus for a direct injection type internal combustion engine according to a second aspect of the invention includes a control unit. The control unit that estimates an amount of fuel that is vaporized from fuel mixed in lubricating oil used in the internal combustion engine, based on an estimated degree to which the lubricating oil has been diluted with the fuel, and that controls fuel injection based on the amount of fuel vaporized.

The amount of vaporized dilution-fuel and the degree of fuel dilution are proportional to each other. According to the second aspect, the degree of fuel dilution can be accurately estimated by estimating the vaporization amount based on the estimated degree of fuel dilution.

BRIEF DESCRIPTION OF THE DRAWINGS

The foregoing and/or further objects, features and advantages of the invention will become more apparent from the following description of preferred embodiment with reference to the accompanying drawings, in which the same or corresponding portions are denoted by the same reference numerals and wherein:

FIG. 4 illustrates the dilution-fuel increase amount calculating map used in the "dilution-fuel increase amount estimating routine" in the first embodiment;

FIG. 11 illustrates the timing chart showing an example of how the dilution-fuel amount changes in the direct injection type internal combustion engine in the third embodiment.

DETAILED DESCRIPTION OF THE EXEMPLARY EMBODIMENTS

In the following description, the invention will be described in more detail in terms of exemplary embodiments.

Hereafter, a first embodiment of the invention will be described with reference to FIG. 1 to FIG. 5.

According to the first embodiment, the degree of fuel dilution can be accurately estimated by estimating the amount of fuel that has mixed with the lubricating oil (hereinafter, such fuel will be referred to as "dilution-fuel"). It is also possible to estimate the increase in the amount of dilution-fuel after an engine was started, through the "dilution-fuel increase amount estimating routine" which will be described later in detail.

Figure 1:
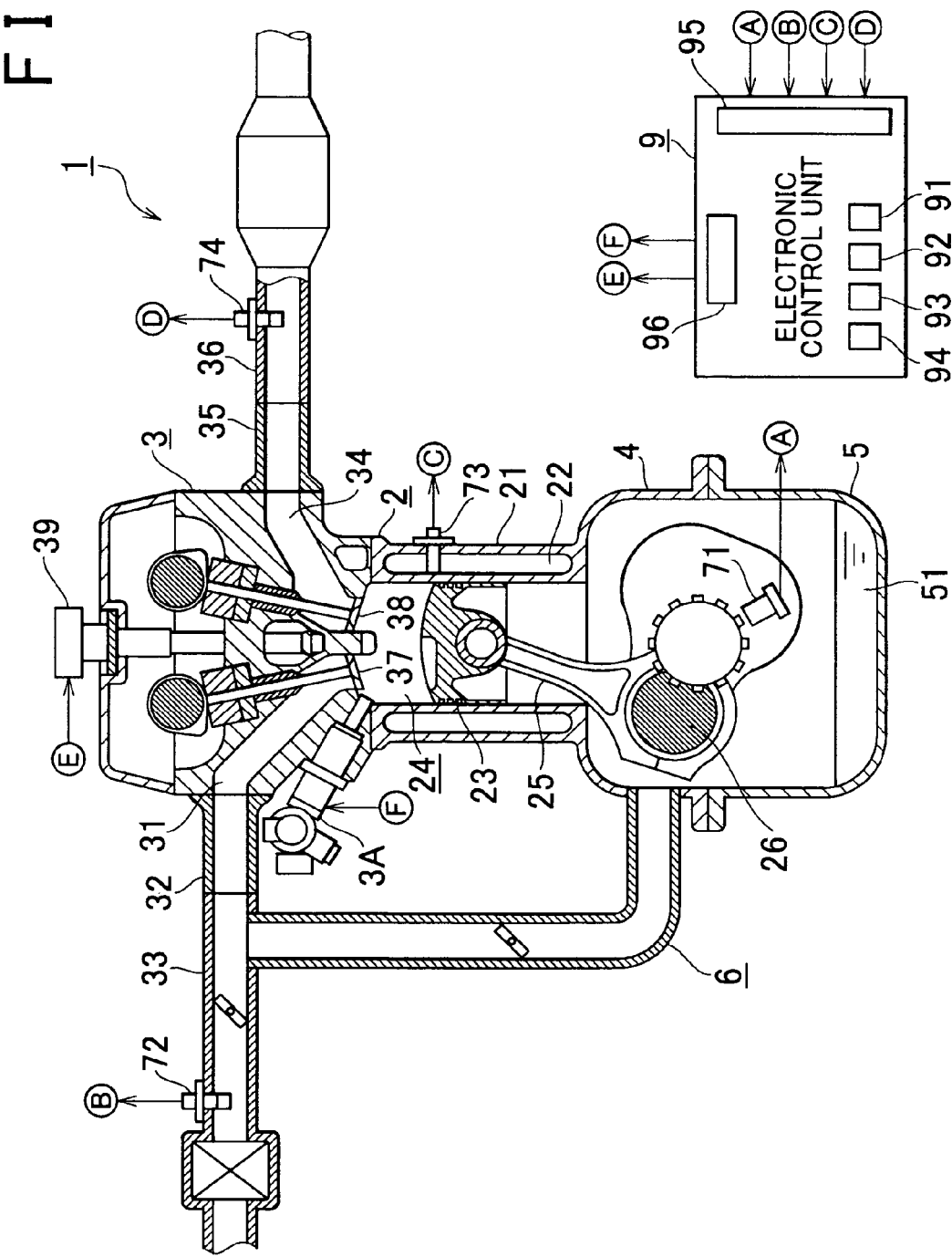
FIG. 1 illustrates the structure of a direct injection type internal combustion engine provided with a fuel injection control apparatus according to a first embodiment of the invention.

FIG. 1 shows the structure of an engine 1 (i.e., a direct injection type internal combustion engine). The engine 1 includes a cylinder block 2 and a cylinder head 3.

The cylinder block 2 is provided with a plurality of cylinders 21. A water jacket 22 is formed in each of the cylinders 21. A piston 23 is provided in each cylinder 21. A combustion chamber 24 is defined by the inner surface of the cylinder 21, the top surface of the piston 23, and the cylinder head 3.

The piston 23 is coupled with a crankshaft 26 via a connecting rod 25. At the position below the cylinder 21, a crankcase 4 is provided integrally with the cylinder block 2.

An oil pan 5 is attached to the lower portion of the crankcase 4. The oil pan 5 stores lubricating oil 51 for the engine 1. An intake port 31 and an exhaust port 34 are formed in the cylinder head 3.

An intake manifold 32 is connected to the intake port 31. An intake pipe 33 is connected to the intake manifold 32. The intake pipe 33, the intake manifold 32, and the intake port 31 constitute an intake passage through which air is taken in the combustion chamber 24 from the outside of the engine 1.

An exhaust manifold 35 is connected to the exhaust port 34. An exhaust pipe 36 is connected to the exhaust manifold 35. The exhaust pipe 36, the exhaust manifold 35, and the exhaust port 34 constitute an exhaust passage through which exhaust gas is discharged from the combustion chamber 24 to the outside of the engine 1.

An intake valve 37 opens/closes the intake port 31. An exhaust valve 38 opens/closes the exhaust port 34. An ignition plug 39 ignites the air-fuel mixture in the combustion chamber 24.

An injector 3A injects fuel directly into the combustion chamber 24. In the engine 1, the gas in the crankcase 4 can be supplied to the intake pipe 33 through a blow-by gas reductor 6.

The engine 1 is controlled by an electronic control unit 9 (hereinafter, simply referred to as an "ECU 9"). A fuel injection control apparatus includes the ECU 9. The ECU 9 includes a central processing unit (hereinafter, simply referred to as a "CPU") 91, read-only memory (hereinafter, simply referred to as "ROM") 92, random-access memory (hereinafter, simply referred to as "RAM") 93, backup memory 94, an input port 95, and an output port 96.

The CPU 91 performs arithmetic processing related to the engine control. The ROM 92 stores programs, maps and the like used for the engine control, in advance. The RAM 93 temporarily stores the results of arithmetic processing performed by the CPU 91. The backup memory 94 stores the results of arithmetic processing and the stored data, even after the engine 1 stops. The signals from elements outside the ECU 9 are input in the CPU 91 through the input port 95. The signals from the CPU 91 are output to elements outside the ECU 9 through the CPU 91.

Various sensors (a rotational speed sensor 71, an intake air amount sensor 72, a coolant temperature sensor 73, and an air-fuel ratio sensor 74), which detect the running state of the engine 1, are connected to the input port 95 of the ECU 9.

The rotational speed sensor 71 detects the rotational speed of the crankshaft 26. The data obtained by the rotational speed sensor 71 is input in the ECU 9 as an engine speed NE.

The intake air amount sensor 72 detects the amount of air taken in by the engine 1. The data obtained by the intake air amount sensor 72 is input in the ECU 9 as an intake air amount GA.

The coolant sensor 73 detects the temperature of the coolant in the water jacket 22. The data obtained by the coolant sensor 73 is input in the ECU 9 as a coolant temperature THW.

The air-fuel ratio sensor 74 detects the air-fuel ratio of the air-fuel mixture. The data obtained by the air-fuel ratio sensor 74 is input in the ECU 9 as an air-fuel ratio 25. AF.

The output port 96 of the ECU 9 is connected to the ignition plug 39, the injector 3A, and the like. The ECU 9 controls, for example, ignition timing of the ignition plug 39, the amount of fuel injected from the injector 3A, the air-fuel ratio of the air-fuel mixture.

Next, dilution of lubricating oil with fuel will be described in detail. In the engine 1, if the fuel injected from the injector 3A is not sufficiently atomized (mainly, when the engine 1 is cold), a large amount of the injected fuel adheres to the inner surface of the cylinder 21, and becomes mixed with the lubricating oil 51. As a result, the lubricating oil 51 is diluted with the fuel. The lubricating oil 51 containing the fuel drops into the oil pan 5 due to reciprocation of the piston 23.

The fuel contained in the lubricating oil 51 in the oil pan 5 (hereinafter, such fuel will be referred to as "dilution-fuel") vaporizes as the temperature of the lubricating oil 51 increases, the vaporized fuel is then supplied to the intake pipe 33 through the blow-by gas reductor 6. Accordingly, in the engine 1, the amount of fuel supplied from the crankcase 4 to the intake pipe 33 needs to be taken into account when determining the final fuel injection amount. Hereafter, the routine of setting the fuel injection amount will be described in detail.

Figure 2:
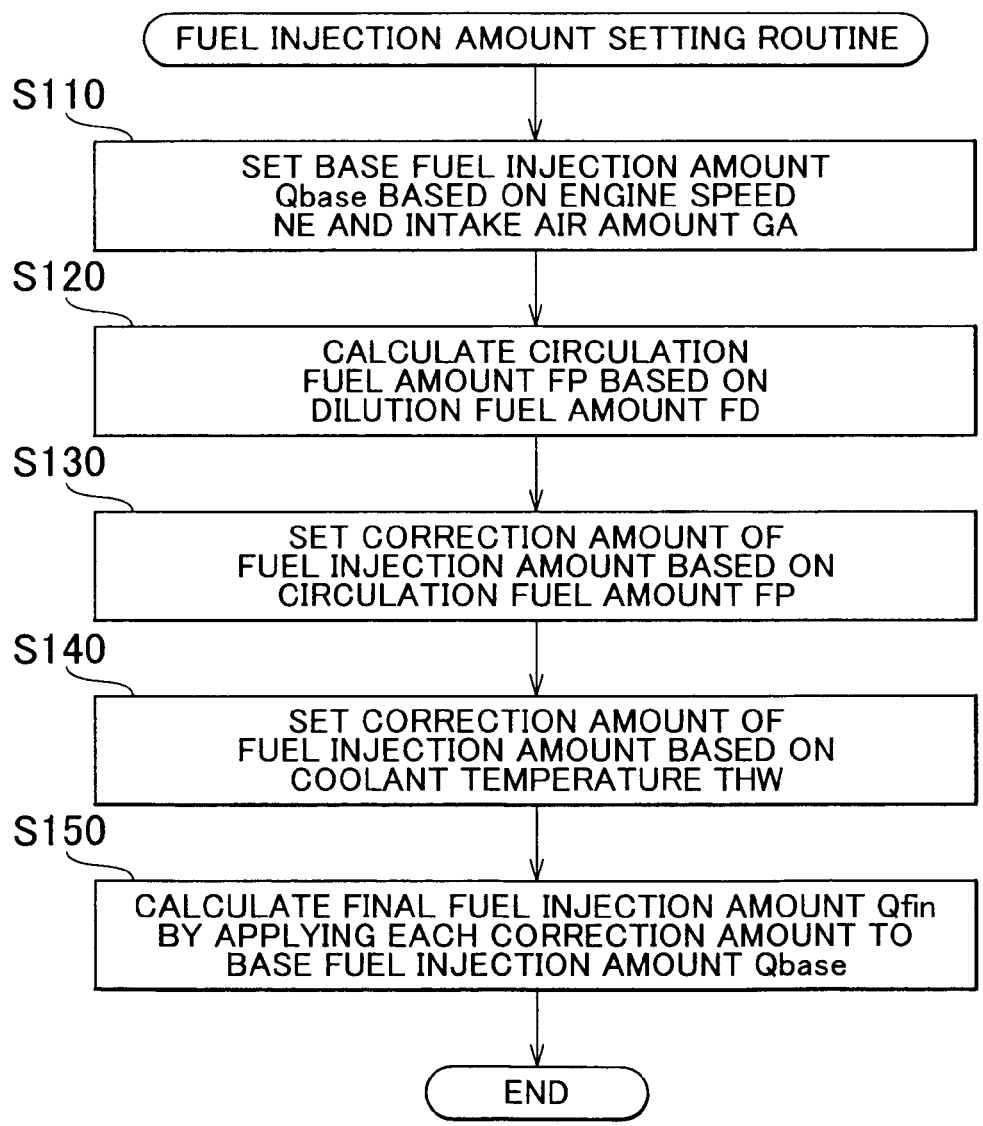
FIG. 2 illustrates the flowchart showing steps in the "fuel injection amount setting routine" performed by the fuel injection control apparatus according to the first embodiment.

The "fuel injection amount setting routine" will be described with reference to FIG. 2. The ECU 9 performs the fuel injection amount setting routine. The fuel injection amount setting routine is periodically performed as an interrupt at predetermined crank angle intervals.

In step S110, the ECU 9 sets a base fuel injection amount Qbase based on the engine speed NE and the intake air amount GA. In step S120, the ECU 9 estimates the amount of fuel to be supplied to the intake pipe 33 (hereinafter, referred to as a "circulation fuel amount FP") based on the amount of fuel present in the lubricating oil (hereinafter, referred to as a "dilution-fuel amount FD").

In step S130, the ECU 9 sets the correction amount of the fuel injection amount for the base fuel injection amount Qbase. In step S140, the ECU 9 sets the correction amount of the fuel injection amount for the base fuel injection amount Qbase, based on the coolant temperature THW.

In step S150, the ECU 9 sets the command value (a final fuel injection amount Qfin) indicating the amount fuel to be injected from the injector 3A, by applying the correction amount based on the circulation fuel amount FP, the correction amount based on the coolant temperature THW, and the other correction amounts, to the base fuel injection amount Qbase.

As described so far, in the fuel injection control, the base fuel injection amount Qbase is corrected based on the circulation fuel amount FP that is estimated based on the dilution-fuel amount FD. Accordingly, the dilution-fuel amount FD needs to be accurately estimated to set the final fuel injection amount Qfin to an appropriate value.

In the first embodiment, therefore, the dilution-fuel amount FD can be accurately estimated by estimating the increase in the dilution-fuel amount while the engine 1 has been running, through the "dilution-fuel increase amount estimating routine" that will be described below.

The dilution-fuel amount FD used in the "fuel injection amount setting routine" is calculated based on the amount of increase in the dilution-fuel that is estimated through the "dilution-fuel increase amount estimating routine" and the amount of vaporized dilution-fuel estimated through another routine.

The dilution-fuel amount FD is updated in the ECU 9 in the following manner during the period from the engine 1 starts until it stops.

(a) When the engine 1 starts, the dilution-fuel amount FD stored in the backup memory 94 is read, and then stored in the RAM 93.
(b) While the engine 1 is running, the dilution-fuel amount FD stored in the RAM 93 is updated based on the results of arithmetic processing performed by the CPU 91.
(c) After the engine 1 stops, the dilution-fuel amount FD stored in the RAM 93 is stored in the backup memory 94.

Figure 3:
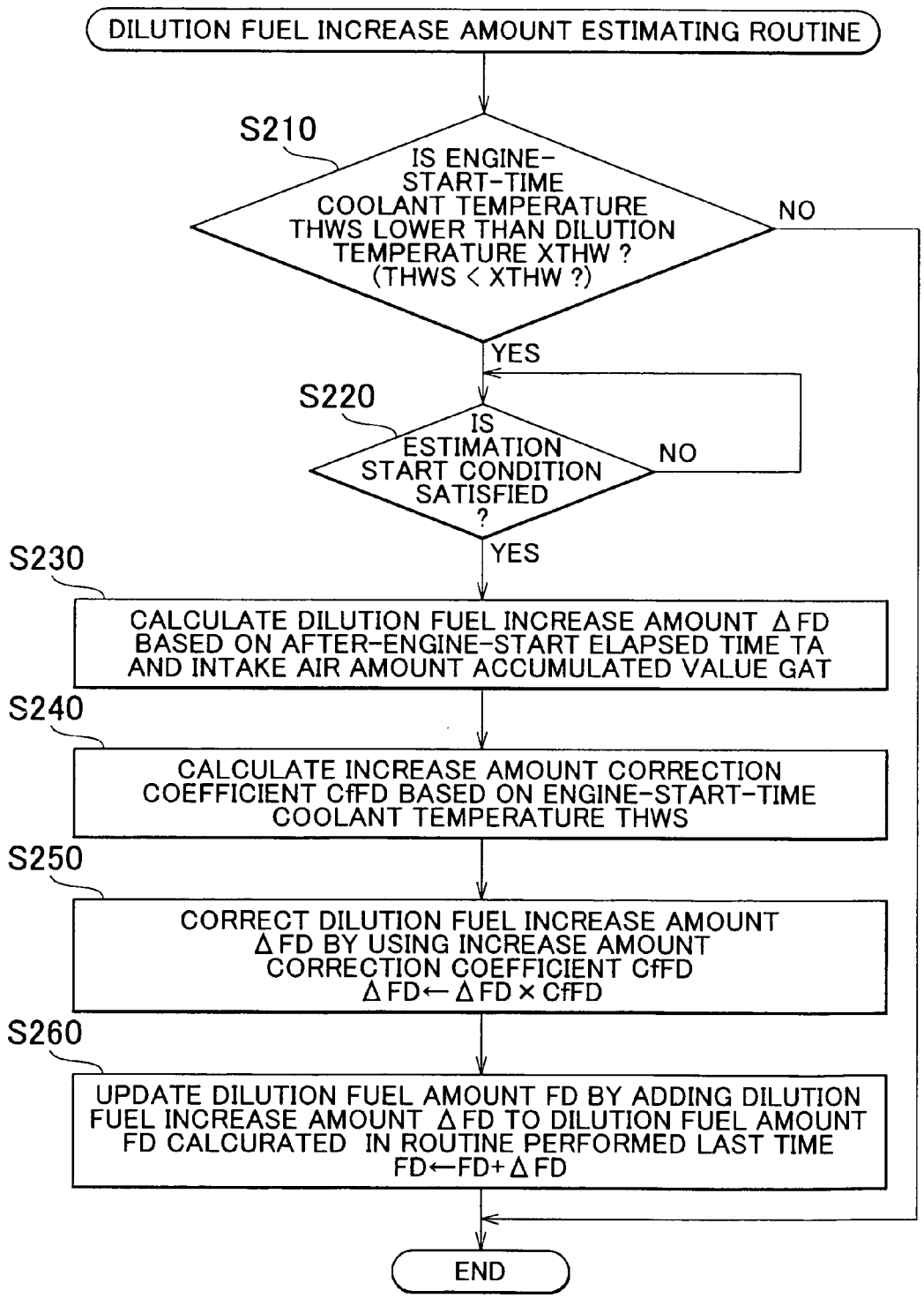
FIG. 3 illustrates the flowchart showing steps of the "dilution-fuel increase amount estimating routine" performed by the fuel injection control apparatus according to the first embodiment.
Figure 5:
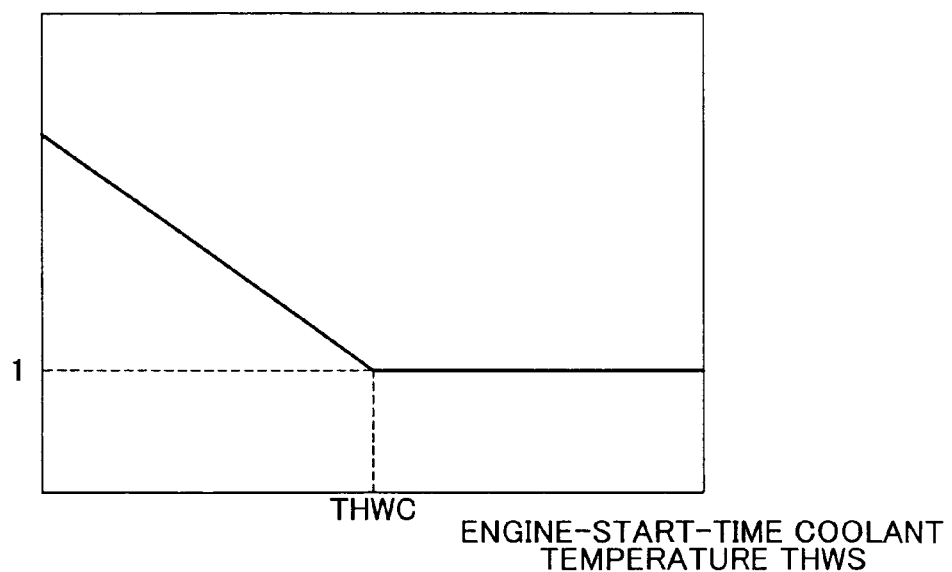
FIG. 5 illustrates the increase amount correction coefficient calculating map used in the "dilution-fuel increase amount estimating routine" in the first embodiment.

The "dilution-fuel increase amount estimating routine" will be described in detail with reference to FIG. 3. The ECU 9 performs the dilution-fuel increase amount estimating routine.

In the "dilution-fuel increase amount estimating routine", when the amount of dilution-fuel stops increasing, the increase in the amount of dilution-fuel while the engine 1 has been running is calculated based on the length of time the engine 1 has been running and the accumulated value that indicates the amount of air that has taken in the engine 1 while the engine 1 has been running. Then, the increase in the amount of the dilution-fuel is reflected on the dilution-fuel amount FD. Hereafter, the steps in the dilution-fuel increase amount estimating routine will be described in detail.

In step S210, the ECU 9 determines whether the coolant temperature when the engine 1 starts (hereinafter, referred to as an "engine-start-time coolant temperature THWS") is lower than a dilution temperature XTHW. The dilution temperature XTHW is set in advance as the reference value used to determine whether the engine 1 has started under conditions where fuel dilution occurs.

The ECU 9 determines in step S210 whether the engine 1 has started under conditions where fuel dilution occurs, in the following manner.

When the engine-start-time coolant temperature THWS is lower than the dilution temperature XTHW, the ECU 9 determines that the engine 1 has started under conditions where fuel dilution occurs. Namely, the ECU 9 determines that fuel dilution has occurred while the engine 1 has been running. When making such a determination, the ECU 9 performs step S220.

On the other hand, when the engine-start-time coolant temperature THWS is equal to or higher than the dilution temperature XTHW, the ECU 9 determines that the engine 1 has started under conditions where fuel dilution does not occur. Namely, the ECU 9 determines that fuel dilution has not occurred while the engine 1 has been running. When making such a determination, the ECU 9 ends the "dilution-fuel increase amount estimating routine".

In step S220, the ECU 9 determines whether the condition where estimation of the amount of increase in the dilution-fuel starts (hereinafter, referred to as the "estimation start condition") has been satisfied. The ECU 9 determines that the estimation start condition is satisfied, when the accumulated value of the intake air amount GA (hereinafter, referred to as an "intake air amount accumulated value GAT") is equal to or greater than a reference accumulated value XGA, or when the engine 1 stops.

The reference accumulated value XGA is set in advance as the reference value used to determine whether the temperature of the cylinder 21 is sufficiently high (i.e., whether the temperature of the cylinder 21 is a value at which the fuel dilution no longer occurs because the fuel adhering to the inner surface of the cylinder 21 is vaporized).

The ECU 9 determines in step S220 whether the fuel dilution no longer occurs, in the following manner.

The ECU 9 determines that the amount of dilution-fuel is increasing, when "the intake air amount accumulated value GAT is less than the reference accumulated value XGA" and "the engine 1 is running". Namely, the ECU 9 determines that the fuel adhering to the inner surface of the cylinder 21 is not sufficiently vaporized and the fuel that has not been vaporized is contained the lubricating oil 51. When making such a determination, the ECU 9 performs step S220 again after a predetermined time has elapsed.

The ECU 9 determines that the amount of dilution-fuel has stopped increasing, when "the intake air amount accumulated value GAT is equal to or greater than the reference accumulated value XGA" or when "the engine 1 is not running". Namely, the ECU 9 determines that the fuel adhering to the inner surface of the cylinder 21 is sufficiently vaporized and the fuel is not mixed into the lubricating oil 51. When making such a determination, the ECU 9 performs step S230.

In step S230, the ECU 9 estimates the increase in the amount of dilution-fuel present in the lubricating oil while the engine 1 has been running (hereinafter, referred to as a "dilution-fuel increase amount ΔFD") based on the length of time the engine 1 has been running (hereinafter, referred to as an "after-engine start elapsed time TA") and the intake air amount accumulated value GAT. In this case, the dilution-fuel increase amount ΔFD is calculated by plotting the after-engine-start elapsed time TA and the intake air amount accumulated value GAT on the dilution-fuel increase amount calculating map in FIG. 4.

In the dilution-fuel increase amount calculating map, the relationship between the after-engine-start elapsed time TA and the intake air amount accumulated value GAT, and the dilution-fuel increase amount ΔFD is set as described below. When the intake air amount accumulated value GAT is constant, the dilution-fuel increase amount ΔFD decreases as the after-engine-start elapsed time TA increases. For any given interval of the after-engine-start elapsed time TA, the dilution-fuel increase amount ΔFD increases as the intake air amount accumulated value GAT increases.

In the situation where fuel dilution occurs, the amount of fuel adhering to the inner surface of the cylinder 21 increases in proportion with the total amount of fuel supplied to the combustion chamber 24. Accordingly, the dilution-fuel increase amount ΔFD is likely to increase as the intake air amount accumulated value GAT correlated with the total fuel amount increases.

There is a correlation between the after-engine-start elapsed time TA and the dilution-fuel increase amount ΔFD. The dilution-fuel increase amount ΔFD decreases as the after-engine-start elapsed time TA increases, regardless of the intake air amount accumulated value GAT.

In step S240, the ECU 9 calculates the correction coefficient for the dilution-fuel increase amount ΔFD (hereinafter, referred to as an "increase amount correction coefficient CfFD") based on the engine-start-time coolant temperature THWS. In this case, the increase amount correction coefficient CfFD is calculated by plotting the engine-start-time coolant temperature THWS on the increase amount correction coefficient calculating map in FIG. 5.

In the increase amount correction coefficient calculating map, the following relationship is set between the engine-start-time coolant temperature THWS and the increase amount correction coefficient CfFD. When the engine-start-time coolant temperature THWS is equal to or higher than a cold-time correction temperature THWC, because the cold-time correction amount is set to "0", the increase amount correction coefficient CfFD is set to "1". On the other hand, when the engine-start-time coolant temperature THWS is lower than the cold-time correction temperature THWC, the cold-time correction amount is set to a greater value as the engine-start-time coolant temperature THWS decreases. Accordingly, the increase amount correction coefficient CfFD is set to a greater value as the coolant temperature THW decreases. The cold-time correction temperature THWC is the reference value used to determine whether the base fuel injection amount Qbase should be increased by the increase correction amount of fuel injection amount based on the coolant temperature THW (hereinafter, referred to as the "cold-time correction amount").

In step S250, the ECU 9 calculates the dilution-fuel increase amount ΔFD corrected based on the engine-start-time coolant temperature THWS, by multiplying the dilution-fuel increase amount ΔFD by the increase amount correction coefficient CfFD. Namely, the ECU 9 corrects the dilution-fuel increase amount ΔFD calculated by using the dilution-fuel increase amount calculating map, according to the following equation (1).

$$\Delta FD \leftarrow \Delta FD \times CfFD \qquad \text{Equation (1)}$$

In step S260, the ECU 9 calculates the most recent dilution-fuel amount FD by adding the dilution-fuel increase amount ΔFD to the dilution-fuel amount FD calculated in the routine performed last time. Namely, the ECU 9 updates the dilution-fuel amount FD stored in the RAM 93, according to the following equation (2).

$$FD \leftarrow FD + \Delta FD \qquad \text{Equation (2)}$$

As described so far in detail, the fuel injection control apparatus for the direct injection type internal combustion engine according to the first embodiment produces the following effects.

(1) In the first embodiment, the ECU 9 estimates the dilution-fuel increase amount ΔFD based on the after-engine-start elapsed time TA and the intake air amount accumulated value GAT. As a result, the dilution-fuel amount FD can be accurately estimated.

(2) In the first embodiment, the ECU 9 corrects the dilution-fuel increase amount ΔFD based on the increase amount correction coefficient CfFD calculated based on the coolant temperature THW. As a result, the dilution-fuel amount FD can be estimated further accurately.

The configuration of the first embodiment may be appropriately modified. For example, the first embodiment may be modified as follows.

In the first embodiment, the ECU 9 estimates the dilution-fuel increase amount ΔFD only after the estimation start condition is satisfied. However, the ECU 9 may instead estimate the dilution-fuel increase amount ΔFD at predetermined time intervals, after the engine 1 started.

In the first embodiment, the ECU 9 determines whether the amount of dilution-fuel is increasing based on the result of comparison between the intake air amount accumulated value GAT and the reference accumulated value XGA. However, the ECU 9 may determine whether the dilution-fuel is increasing, based on the result of comparison between the accumulated value of the fuel injection amount and the reference accumulated value XGA.

In the first embodiment, the ECU 9 estimates the dilution-fuel increase amount ΔFD based on the after-engine-start elapsed time TA and the intake air amount accumulated value GAT. However, the accumulated value of the fuel injection amount may be used instead of the intake air amount accumulated value GAT. In this case, the relationship between the after-engine-start elapsed time TA and the accumulated value of the fuel injection amount, and the dilution-fuel increase amount ΔFD may be set by using the map similar to the dilution-fuel increase amount calculating map in the first embodiment.

Next, a second embodiment of the invention will be described in detail with reference to FIG. 6 to FIG. 9. In the second embodiment, the amount of dilution-fuel that has vaporized while the engine 1 has been running is estimated through the "vaporized dilution-fuel amount estimating routine" that will be described below. Thus, the degree of fuel dilution (the dilution-fuel amount FD) can be accurately estimated.

In the second embodiment, an engine 1 (see FIG. 1) having the same structure as that in the first embodiment is used.

In the second embodiment, the same routine as the "fuel injection amount setting routine" (see FIG. 2) in the first embodiment is performed. The dilution-fuel amount FD that is used in the "fuel injection amount setting routine" is calculated based on the amount of vaporized dilution-fuel that is estimated through the "vaporized dilution-fuel amount estimating routine" and the amount of increase in the dilution-fuel that is estimated through another routine.

Figure 6:
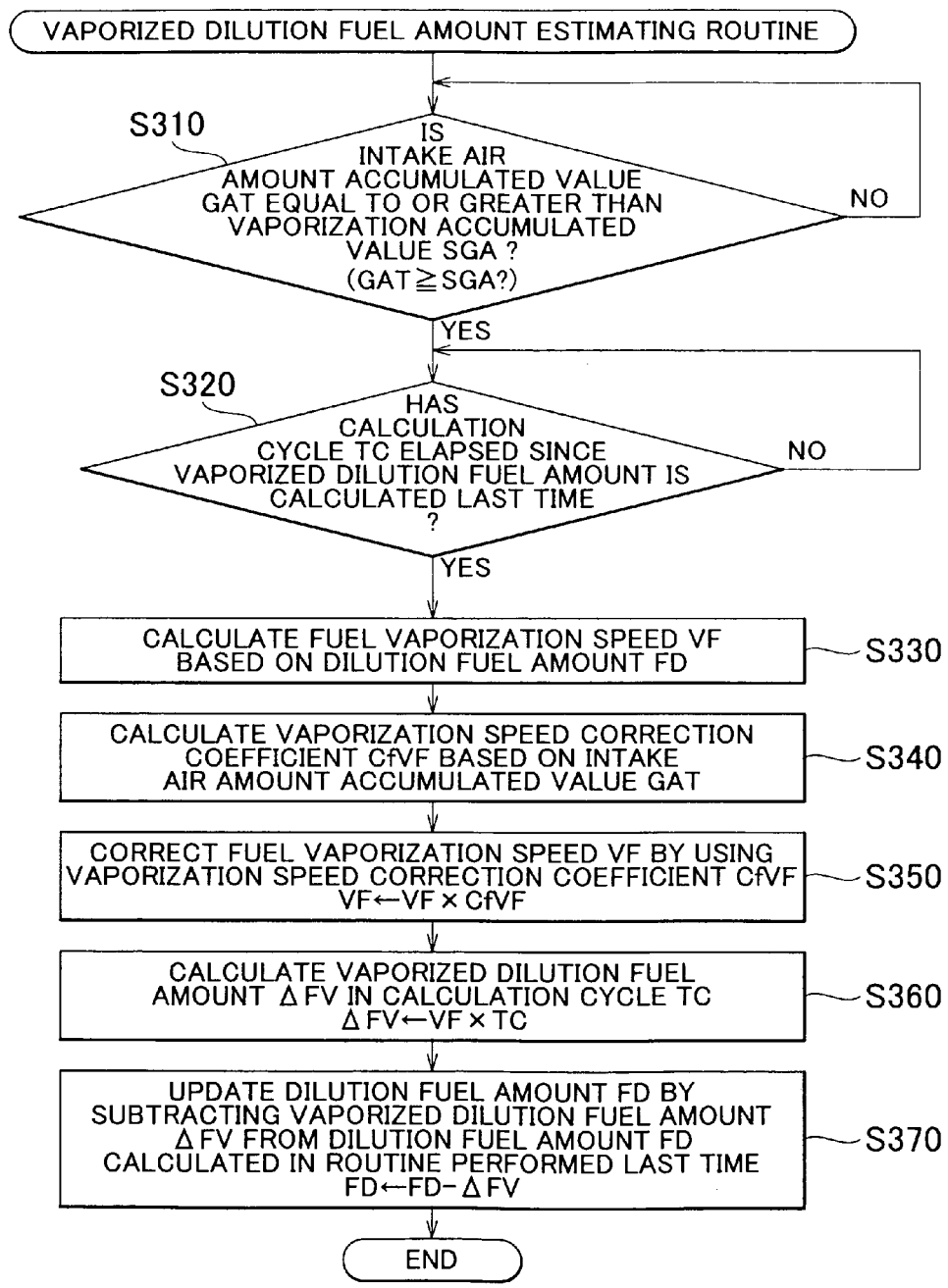
FIG. 6 illustrates the flowchart showing steps in the "vaporized dilution-fuel amount estimating routine" performed by a fuel injection control apparatus for a direct injection type internal combustion engine according to a second embodiment of the invention.
Figure 7:
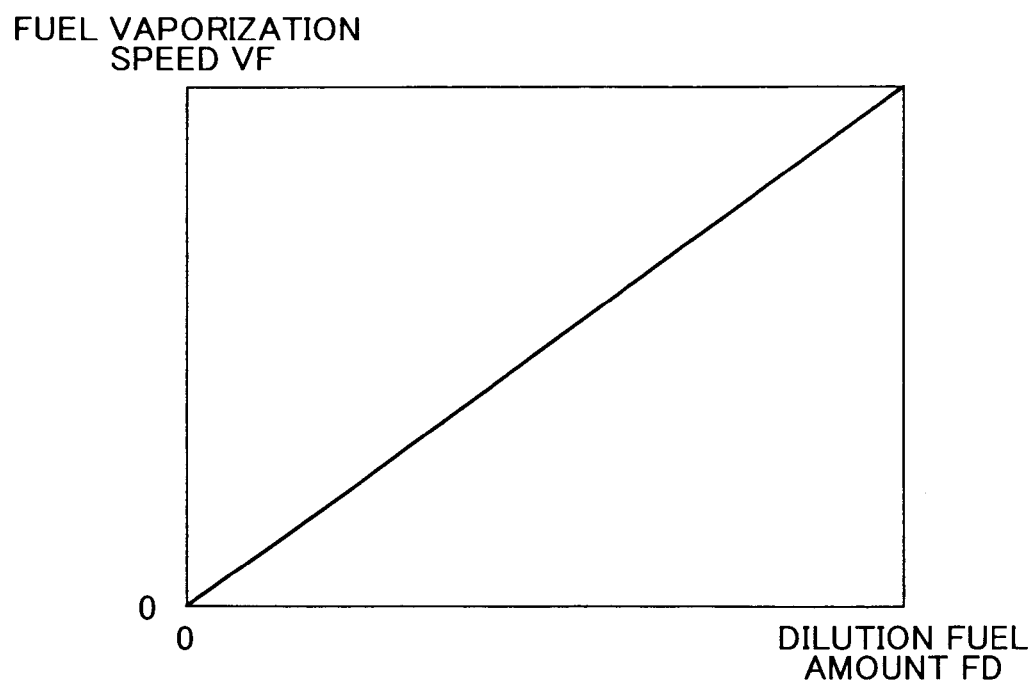
FIG. 7 illustrates the fuel vaporization speed calculating map used in the "vaporized dilution-fuel amount estimating routine" in the second embodiment.

The "vaporized dilution-fuel amount estimating routine" will be described in detail with reference to FIG. 6. The ECU 9 performs the vaporized dilution-fuel amount estimating routine.

In this routine, when the dilution-fuel is being vaporized, the ECU 9 calculates the speed of vaporization (hereinafter, referred to as the "vaporization speed") of the dilution-fuel based on the dilution-fuel amount. The amount of vaporized dilution-fuel calculated based on the vaporization speed is reflected on the dilution-fuel amount FD. Hereafter, the steps in this routine will be described in detail.

In step S310, the ECU 9 determines whether the intake air amount accumulated value GAT is equal to or greater than a vaporization accumulated value SGA. The vaporization accumulated value SGA is set in advance as the reference value used to determine whether the temperature of the lubricating oil 51 in the oil pan 5 has reached a sufficiently high temperature (i.e., a temperature at which the dilution-fuel is vaporized).

The ECU 9 determines in step S310 whether the dilution-fuel is being vaporized from the lubricating oil 51, in the following manner.

When the intake air amount accumulated value GAT is equal to or greater than the vaporization accumulated value SGA, the ECU 9 determines that the dilution-fuel is being vaporized from the lubricating oil 51 in the oil pan 5. When making such a determination, the ECU 9 performs step S320.

On the other hand, when the intake air amount accumulated value GAT is less than the vaporization accumulated value SGA, the ECU 9 determines that the dilution-fuel is not being vaporized from the lubricating oil 51 in the oil pan 5. When making such a determination, the ECU 9 performs step S310 again after a predetermined time has elapsed.

In step S320, the ECU 9 determines whether the predetermined time (i.e., calculation cycle TC) has elapsed since the amount of vaporized dilution-fuel was calculated in the routine performed last time. When the routine is initially performed, the ECU 9 determines whether the calculation cycle TC has elapsed since step S310 is completed.

In step S330, the ECU 9 calculates a vaporization speed (hereinafter, referred to as a "fuel vaporization speed VF") indicating a change in the amount of vaporized dilution-fuel per unit time, based on the dilution-fuel amount FD. In this case, the fuel vaporization speed VF is calculated by plotting the dilution-fuel amount FD on the fuel vaporization speed calculating map in FIG. 7.

In the fuel vaporization speed map, the relationship between the dilution-fuel amount FD and the fuel vaporization speed VF is set such that the fuel vaporization speed VF increases, at a constant rate, with the increase in the dilution-fuel amount FD.

The dilution-fuel contained in the lubricating oil 51 stored in the oil pan 5 is vaporized from the surface of the lubricating oil 51. The area at which the lubricating oil 51 in the oil pan 5 contacts the air in the crankcase 4 is substantially constant. Accordingly, the fuel vaporization speed VF changes depending on the dilution-fuel amount FD.

In step S340, the ECU 9 calculates the correction coefficient (hereinafter, referred to as a "vaporization speed correction coefficient CfVF") for the fuel vaporization speed VF, based on the intake air amount accumulated value GAT. In this case, the vaporization speed correction coefficient CfVF is calculated by plotting the intake air amount accumulated value GAT on the vaporization speed correction coefficient calculating map in FIG. 8.

In step S340, the intake air amount accumulated value GAT is used as the index value of the temperature of the lubricating oil 51 (hereinafter, referred to as a "lubricating oil temperature TO"). Namely, the vaporization speed correction coefficient CfVF is calculated as the coefficient used to correct the fuel vaporization speed VF based on the lubricating oil temperature TO.

Figure 9:
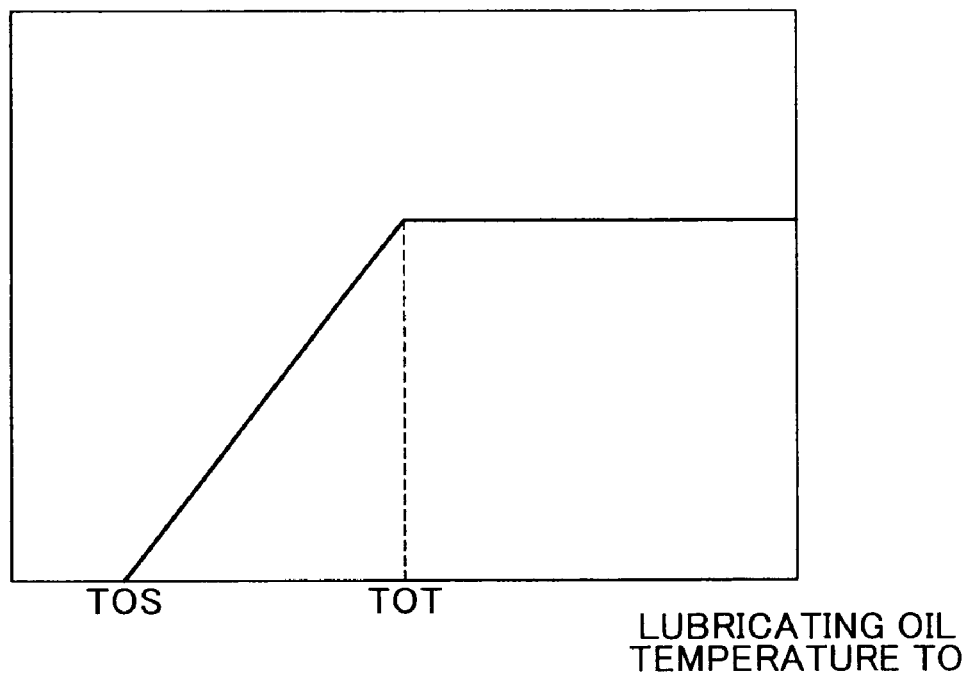
FIG. 9 illustrates the vaporization speed correction coefficient calculating map used in the "vaporized dilution-fuel amount estimating routine" in the second embodiment.

The relationship between the lubricating oil temperature TO and the fuel vaporization speed VF will be described with reference to FIG. 9. A vaporization temperature TOS indicates the lubricating oil temperature TO at which vaporization of the dilution-fuel starts. A threshold temperature TOT indicates the lubricating oil temperature TO at which the rate of change in the fuel vaporization speed VF with respect to a change in the lubricating oil temperature TO becomes substantially constant.

When the lubricating oil temperature TO is equal to or higher than the threshold temperature TOT, the fuel vaporization speed VF is substantially constant independently of the change in the lubricating oil temperature TO. When the lubricating oil temperature is lower than the threshold temperature TOT, the fuel vaporization speed VF decreases as the lubricating oil temperature TO comes closer to the vaporization temperature TOS.

Figure 8:
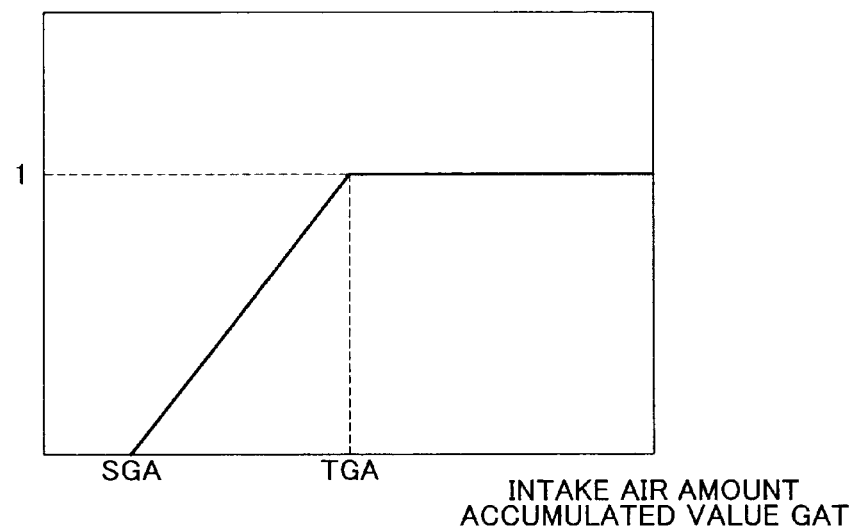
FIG. 8 illustrates the graph showing the relationship between the temperature of lubricating oil and the fuel vaporization speed, based on which the vaporization speed correction coefficient is set in the "vaporized dilution-fuel amount estimating routine" in the second embodiment.

In a vaporization speed correction coefficient calculating map in FIG. 8, the relationship between the intake air amount accumulated value GAT and the vaporization speed correction coefficient CfVF is set based on the relationship between the lubricating oil temperature TO and the fuel vaporization speed VF.

(a) When the intake air amount accumulated value GAT is equal to or greater than the value corresponding to the threshold temperature TOT (hereinafter, referred to as a "constant accumulated value TGA"), the vaporization speed correction coefficient CfVF is set to "1".

(b) When the intake air amount accumulated value GAT is less than the constant accumulated value TGA, the vaporization speed correction coefficient CfVF is set to a smaller value as the intake air amount accumulated value GAT decreases.

(c) When the intake air amount accumulated value GAT is the value corresponding to the vaporization temperature TOS (hereinafter, referred to as a "vaporization accumulated value SGA"), the vaporization speed correction coefficient CfVF is set to the minimum value.

In step S350, the ECU 9 calculates the fuel vaporization speed VF corrected based on the intake air accumulated value GAT (the lubricating oil temperature TO), by multiplying the fuel vaporization speed VF by the vaporization speed correction coefficient CfVF. Namely, the ECU 9 corrects the fuel vaporization speed VF calculated by using the fuel vaporization speed calculating map, according to the following equation (3).

$$VF \leftarrow VF \times CfVF \qquad \text{Equation (3)}$$

In step S360, the ECU 9 calculates a vaporized dilution-fuel amount ΔFV by multiplying the fuel vaporization speed VF by the calculation cycle TC. Namely, the ECU 9 calculates the amount of dilution-fuel that vaporized from the lubricating oil 51 during the calculation cycle TC, according to the following equation (4).

$$\Delta FV \leftarrow VF \times TC \qquad \text{Equation (4)}$$

In step S370, the ECU 9 calculates the most recent dilution-fuel amount FD by subtracting the vaporized dilution-fuel amount ΔFV from the dilution-fuel amount FD that is calculated in the routine performed last time. Namely, the ECU 9 updates the dilution-fuel amount FD stored in the RAM 93 according to the following equation (5).

$$FD \leftarrow FD - \Delta FV \qquad \text{Equation (5)}$$

As described so far, the direct injection type internal combustion engine according to the second embodiment produces the following effects.

(1) In the second embodiment, the ECU 9 estimates the vaporized dilution-fuel amount ΔFV based on the dilution-fuel amount FD, on the assumption that the dilution-fuel amount FD and the fuel dilution vaporization speed VF are directly proportional to each other, namely, as the dilution-fuel amount FD increases the fuel dilution vaporization speed VF increases. Thus, with a simple configuration, the dilution-fuel amount FD can be accurately estimated.

(2) In the second embodiment, the ECU 9 corrects the fuel vaporization speed VF by using the vaporization speed correction coefficient CfVF calculated based on the lubricating oil temperature TO (the intake air amount accumulated value GAT). Thus, the dilution-fuel amount FD can be estimated further accurately.

The configuration of the second embodiment may be appropriately modified. For example, the second embodiment may be modified as follows.

In the second embodiment, the ECU 9 determines whether the dilution-fuel is being vaporized based on the result of comparison between the intake air amount accumulated value GAT and the vaporization accumulated value SGA. However, the ECU 9 may also determine whether the dilution-fuel is being vaporized based on the result of comparison between the accumulated value of the fuel injection amount and the vaporization accumulated value SGA.

In the second embodiment, the intake air amount accumulated value GAT is used as the index value of the lubricating oil temperature TO, and the vaporization speed correction coefficient CfVF is calculated based on the intake air amount accumulated value GAT. However, instead of the intake air amount accumulated value GAT, the accumulated value of the fuel injection amount may be used as the index value of the lubricating oil temperature TO, and the vaporization speed correction coefficient CfVF may be calculated based on this accumulated value. In this case, the relationship between the accumulated value of the fuel injection amount and the vaporization speed correction coefficient CfVF may be set by using the map similar to the vaporization speed correction coefficient calculating map in the second embodiment.

Figure 10:
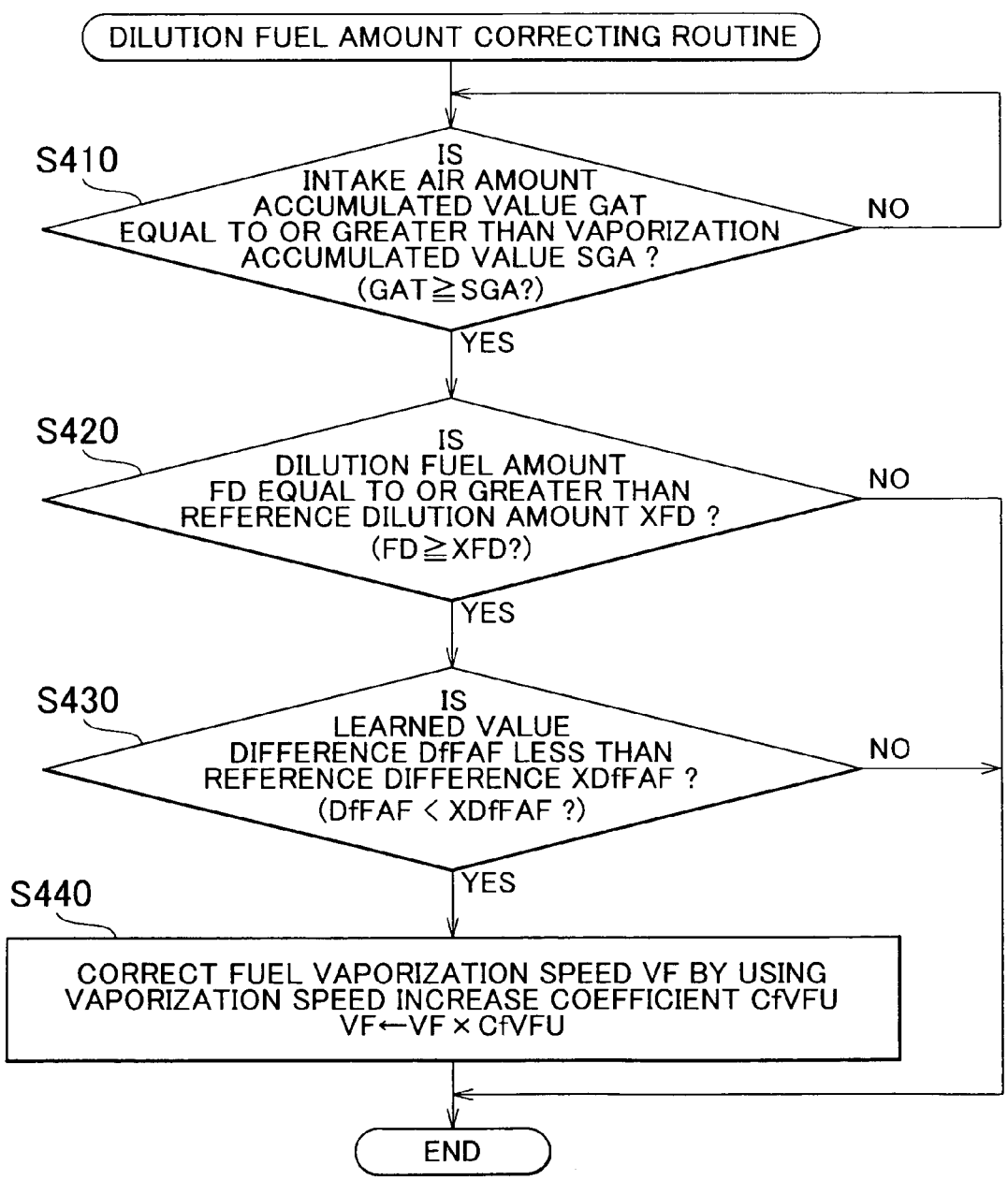
FIG. 10 illustrates the flowchart showing steps in the "dilution-fuel amount correcting routine" performed by a fuel injection control apparatus for a direct injection type internal combustion engine according to a third embodiment of the invention.

A third embodiment of the invention will be described in detail with reference to FIG. 10 and FIG. 11. In the engine 1 where fuel dilution has occurred, if the lubricating oil 51 containing the dilution-fuel is replaced with new lubricating oil, the lubricating oil which has not been diluted by fuel is newly supplied to the engine 1. Therefore, the dilution-fuel amount FD stored in the backup memory 94 and the actual dilution-fuel amount (hereinafter, referred to as an "actual dilution amount FR") differ from each other. In this case, the base fuel injection amount Qbase is corrected based on the dilution-fuel amount FD, which does not indicate the actual dilution-fuel amount, during the running of the engine 1 after the replacement of the lubricating oil 51. As a result, the running state may deteriorate.

In this case, because the amount of dilution-fuel contained in the lubricating oil 51 decreases by a large amount when the engine 1 stops (the amount of dilution-fuel decreases to "0" or a value close to "0"), the dilution-fuel amount FD stored in the backup memory 94 and the actual dilution amount FR differ significantly from each other. Accordingly, the difference needs to be accurately detected, and reflected on the dilution-fuel amount FD during the running of the engine 1.

In the third embodiment, therefore, the "dilution-fuel amount correcting routine", which will be described below, is performed to compensate for the difference between the dilution-fuel amount FD and the actual dilution amount FR, and to suppress deterioration in the running state of the engine 1. The third embodiment is achieved by adding the "dilution-fuel amount correcting routine" to the second embodiment.

The "dilution-fuel amount correcting routine" will be described in detail with reference to FIG. 10. The ECU 9 performs this routine.

In this routine, when the difference between "0" or a value close to "0", and the dilution-fuel amount FD stored in the RAM 93 exceeds the predetermined permissible value, the ECU 9 determines whether the difference between the dilution-fuel amount FD and the actual dilution amount FR exceeds the permissible value. When determining that the difference between the dilution-fuel amount FD and the actual dilution amount FR exceeds the permissible value, the ECU 9 performs the routine for reducing the difference. The steps in the "dilution-fuel amount correcting routine" will be described in detail.

In step S410, the ECU 9 determines whether the intake air amount accumulated value GAT is equal to or greater than the vaporization accumulated value SGA. The vaporization accumulated value SGA is set in advance as the reference value used to determine whether the temperature of the lubricating oil 51 in the oil pan 5 has reached a sufficiently high temperature (i.e., a temperature at which the dilution-fuel is vaporized).

The ECU 9 determines in step S410 whether the fuel is being vaporized, in the following manner.

When the intake air amount accumulated value GAT is equal to or greater than the vaporization accumulated value SGA, the ECU 9 determines that the fuel is being vaporized from the lubricating oil 51 in the oil pan 5. When making such a determination, the ECU 9 performs step S420.

On the other hand, when the intake air amount accumulated value GAT is less than the vaporization accumulated value SGA, the ECU 9 determines that the fuel is not being vaporized from the lubricating oil 51 in the oil pan 5. When making such a determination, the ECU 9 performs step S410 again after the predetermined time has elapsed.

In step S420, the ECU 9 determines whether the dilution-fuel amount FD is equal to or greater than a reference dilution amount XFD. The reference dilution amount XFD is set in advance as the reference value used to determine whether the difference between the dilution-fuel amount FD and the actual dilution amount FR is permissible, if the actual dilution amount FR is "0" or a value close to "0". Namely, the reference dilution amount XFD is set as the reference value used to determine whether the difference between the actual dilution amount FR that is "0" or a value close to "0", and the dilution-fuel amount FD stored in the RAM 93 (hereinafter, this difference will be referred to as a "dilution-fuel difference DfFD") becomes equal to or greater than an upper limit difference XDfFD.

When the dilution-fuel difference DfFD is less than the upper limit difference XDfFD, it is estimated that the running state of the engine 1 will not deteriorate. On the other hand, when the dilution-fuel difference DfFD is equal to or greater than the upper limit difference XDfFD, it is estimated that the running state of the engine 1 will deteriorate.

The ECU 9 determines in step S420 whether the running state of the engine 1 will deteriorate, in the following manner.

When the dilution-fuel amount FD is equal to or greater than the reference dilution amount XFD, the ECU 9 determines that the running state of the engine 1 may deteriorate due to the difference between the dilution-fuel amount FD and the actual dilution amount FR. When making such a determination, the ECU 9 performs step S430.

When the dilution-fuel amount FD is less than the reference dilution amount XFD, the ECU 9 determines that the running state of the engine 1 will not deteriorate even if the dilution-fuel amount FD and the actual dilution amount FD differ from each other. When making such a determination, the ECU 9 ends the "dilution-fuel amount correcting routine".

In step S430, the ECU 9 determines whether the difference between a learned value obtained by the air-fuel ratio control (hereinafter, referred to as an "air-fuel ratio learned value FAF") and a reference learned value FAFbase (hereinafter, this difference will be referred to as a "learned value difference DfFAF") is less than a reference difference XDfFAF when the engine 1 is running at low load. Whether the engine 1 is running at low load can be determined based on the result of comparison between a value corresponding to the engine load (e.g. fuel injection amount) and the reference value.

The reference learned value FAFbase is the initial value of the air-fuel ratio learned value, that is, the learned value at which the correction amount for the base fuel injection amount Qbase becomes "0". The reference difference XDfFAF is set in advance as the reference value used to determine whether the difference between the dilution-fuel amount FD and the actual dilution amount FR (hereinafter, this difference will be referred to as the "difference DfFD") is equal to or greater than the upper limit difference XDfFD.

The air-fuel ratio learned value FAF changes based on the actual dilution amount FR.

When the actual dilution amount FR is large, the amount of fuel that is vaporized from the lubricating oil 51 and supplied to the combustion chamber 24 increases. Therefore, when the engine 1 is running at low load and the amount of fuel injected from the injector 3A is small, the air-fuel ratio learned value FAF differs from the reference learned value FAFbase by a large amount.

When the actual dilution amount FR is small, the amount of fuel that is vaporized from the lubricating oil 51 and supplied to the combustion chamber 24 is small. Accordingly, when the engine 1 is running at low load and the amount of fuel injected from the injector 3A is small, the difference between the air-fuel ratio learned value FAF and the reference learned value FAFbase becomes smaller than that when the actual dilution amount FR is large.

Accordingly, when the engine 1 is running at low load and the difference between the air-fuel ratio learned value FAF and the reference learned value FAFbase is small, it can be determined that the actual dilution amount FR is small. Namely, the ECU 9 can determine whether the dilution-fuel amount FD and the actual dilution amount FR differ significantly from each other, based on the difference between the air-fuel ratio learned value FAF and the reference learned value FAFbase.

Even when the engine 1 is running at high load, the air-fuel ratio learned value FAF changes under the influence of the actual dilution amount FR. However, the amount of change is smaller than that when the engine 1 is running at low load. Accordingly, it is preferable to determine whether the dilution-fuel amount FD and the actual dilution amount FR differ significantly from each other, based on the air-fuel ratio learned value FAF when the engine 1 is running at low load.

The ECU 9 determines in step S430 whether the dilution-fuel amount FD and the actual dilution amount FR differ significantly from each other, in the following manner.

When the engine 1 is running at low load and the learned value difference DfFAF is less than the reference difference XDfFAF, the ECU 9 determines that the dilution-fuel amount FD and the actual dilution amount FR differ significantly from each other. Namely, the ECU 9 determines that the difference DfFD between the dilution-fuel amount FD and the actual dilution amount FR is equal to or greater than the upper limit difference XDfFD. When making such a determination, the ECU 9 performs step S440.

When the engine 1 is running at low load and the learned value difference DfFAF is equal to or greater than the reference difference XDfFAF, the ECU 9 determines that the difference between the dilution-fuel amount FD and the actual dilution amount FR is permissible. Namely, the ECU 9 determines that the difference DfFD between the dilution-fuel amount FD and the actual dilution amount FR is less than the upper limit difference XDfFD. When making such a determination, the ECU 9 ends the "dilution-fuel amount correcting routine".

In step S440, the ECU 9 sets the fuel vaporization speed VF to a value greater than the value corresponding to the dilution-fuel amount FD (i.e., the fuel vaporization speed VF calculated in step S350 in the "vaporized dilution-fuel amount estimating routine). In this case, the ECU 9 increases the fuel vaporization speed VF by multiplying the fuel vaporization speed VF corresponding to the dilution-fuel amount FD by the predetermined coefficient (a vaporization speed increase coefficient CfVFU>1). Namely, the ECU 9 updates the fuel vaporization speed VF according to the following equation (6).

$$VF \leftarrow VF \times CfVFU \qquad \text{Equation (6)}$$

An example of how the dilution-fuel amount changes will be described with reference to FIG. 11.

When the lubricating oil 51 is replaced with new lubricating oil while the engine 1 is not running, the actual dilution amount FR (indicated by the solid line) is "0" at time t11. Even after time t11, the dilution-fuel amount FD (indicated by the dashed line) stored in the backup memory 94 is maintained at the value calculated when the engine 1 ran last time.

If the engine 1 starts while the engine-start-time coolant temperature THW is lower than the dilution temperature XTHW, the actual dilution amount FR increases until the intake air amount accumulated value GAT reaches the reference accumulated value XGA (from time t112 to time t113).

When the intake air amount accumulated value GAT reaches the reference accumulated value XGA, the dilution-fuel amount FD is updated. At this time, the dilution-fuel increase amount ΔFD, which corresponds to the increase in the actual dilution amount FR while the engine 1 has been running, is added to the previous dilution-fuel amount FD at time t113.

After the intake air amount accumulated value GAT reaches the vaporization accumulated value SGA, the actual dilution amount FR and the dilution-fuel amount FD start decreasing at time t114. Note that, the description is made on the assumption that the vaporization accumulated value SGA is set to a value greater than the reference accumulated value XGA.

In the case where the intake air amount accumulated value GAT is equal to or greater than the vaporization accumulated value SGA, if "the dilution-fuel amount FD is equal to or greater than the reference dilution amount XFD", and "the engine 1 is running at low load", the ECU 9 determines whether the learned value difference DfFAF is less than the reference difference XDfFAF.

When determining that the learned value difference DfFAF is less than the reference difference XDfFAF, the ECU 9 corrects the fuel vaporization speed VF by using the vaporization speed increase coefficient CfVFU. Thus, the amount of change in the dilution-fuel amount FD (indicated by the chain line) after the fuel vaporization speed VF is corrected becomes larger than that (indicated by the dashed line) in the case where the fuel vaporization speed VF is not corrected by the vaporization speed increase coefficient CfVFU. Namely, the dilution-fuel amount FD comes closer to the actual dilution amount FR.

When the difference between the dilution-fuel amount FD and the actual dilution amount FR becomes sufficiently small after the fuel vaporization speed VF is corrected, the ECU 9 cancels correction of the fuel vaporization speed VF (i.e., the ECU 9 sets the vaporization speed increase coefficient CfVFU to "1"). Thus, the difference between the dilution-fuel amount FD and the actual dilution amount FR can be maintained at a small value.

As described so far in detail, the fuel injection control apparatus for a direct injection type internal combustion engine according to the third embodiment produces the following effects in addition to the effects (1) and (2) obtained in the second embodiment.

(3) In the third embodiment, the ECU 9 determines the extent of the difference between the dilution-fuel amount FD and the actual dilution amount FR, based on the learned value difference DfFAF when the engine 1 is running at low load. Thus, if the dilution-fuel amount FD and the actual dilution amount FR differ significantly from each other, such a difference can be detected accurately.

(4) In the third embodiment, when the dilution-fuel amount FD and the actual dilution amount FR differ significantly from each other, the ECU 9 sets the fuel vaporization speed VF to a value greater than the value that is set based on the dilution-fuel amount FD. Thus, the dilution-fuel amount FD decreases by a larger amount than before the fuel vaporization speed FD is corrected. Therefore, the difference between the dilution-fuel amount FD and the actual dilution amount FR can be reduced.

(5) Significant deterioration in the accuracy of estimation of the dilution-fuel amount FD can be avoided.

(6) The ECU 9 corrects the fuel injection amount by reducing the difference between the actual dilution amount FR and the dilution-fuel amount FD. Therefore, even after the dilution-fuel amount is decreased to "0" or a value close to "0" due to the replacement of the lubricating oil (51) while the engine 1 is not running, it is possible to suppress deterioration in the running state during the running of the engine 1 after the replacement of the lubricating oil.

The configuration of the third embodiment may be appropriately modified. For example, the third embodiment may be modified as follows.

In the third embodiment, the ECU 9 determines whether the dilution-fuel is being vaporized, based on the result of comparison between the intake air amount accumulated value GAT and the vaporization accumulated value SGA. However, the ECU 9 may determine whether the dilution-fuel is being vaporized, based on the result of comparison between the accumulated value of the fuel injection amount and the reference value corresponding to the vaporization accumulated value SGA.

In the third embodiment, the fuel vaporization speed VF is multiplied by the predetermined vaporization speed increase coefficient CfVFU. However, the vaporization speed increase coefficient CfVFU may be changed based on the dilution-fuel amount FD. In this case, a map that defines the relationship between the dilution-fuel amount FD and the vaporization speed increase coefficient CfVFU may be prepared. The vaporization speed increase coefficient CfVFU can be calculated by plotting the dilution-fuel amount FD on this map. Also, as the dilution-fuel amount FD increases, the difference between the dilution-fuel amount FD and the actual dilution amount FR increases.

Accordingly, the map may be set such that the vaporization speed increase coefficient CfVFU increases with increases in the dilution-fuel amount FD.

In the third embodiment, the difference between the dilution-fuel amount FD and the actual dilution amount FR is reduced by increasing the fuel vaporization speed. VF. This configuration may be modified, for example, as follows. Namely, when the difference between the dilution-fuel amount FD and the actual dilution amount FR is detected, the difference between the dilution-fuel amount FD and the actual dilution amount FR may be reduced by subtracting the dilution-fuel amount FD, which is stored in the backup memory 94 when the engine 1 is stopped last time, from the most recent dilution-fuel amount FD.

The dilution-fuel amount FD and the actual dilution amount FR differ significantly from each other, basically due to replacement of the lubricating oil performed during the last non-running period of the engine 1. Accordingly, the decrease in the dilution-fuel amount, due to, for example, replacement of the lubricating oil, which is stored in the backup memory 94 as the dilution-fuel amount FD when the engine 1 is stopped last time, should generally correspond to the difference between the actual dilution amount FR and the most recent dilution-fuel amount FD. Accordingly, with this configuration as well, the difference between the dilution-fuel amount FD and the actual dilution amount FR can be reduced, and significant inaccuracies in estimates of the dilution-fuel amount FD can be avoided.

The following modifications may be made in the first to the third embodiments.

The "dilution-fuel increase amount estimating routine" in the first embodiment, and the "vaporized dilution-fuel amount estimating routine" in the second embodiment may be combined.

The "dilution-fuel increase amount estimating routine" in the first embodiment, the "vaporized dilution-fuel amount estimating routine" in the second embodiment, and the "dilution-fuel amount correcting routine" in the third embodiment may be combined.

The configuration of the engine 1 is not limited to that described in each of the first to third embodiments, and may be appropriately modified. Any type of engine may be used, as long as the engine is configured such that the fuel is injected directly in the cylinder 21.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A fuel injection control apparatus for a direct injection type internal combustion engine, comprising:
   a control unit that estimates a degree to which lubricating oil, which is used in the internal combustion engine, has been diluted with fuel, based on a measured length of time the internal combustion engine has been running, and one of an accumulated value that indicates an amount of air that has been taken in by the internal combustion engine while the internal combustion engine has been running and an accumulated value that indicates an amount of fuel that has been injected while the internal combustion engine has been running, and the control unit controlling fuel injection based on the degree to which the lubricating oil has been diluted with the fuel.

2. The fuel injection control apparatus for a direct injection type internal combustion engine according to claim 1, wherein the control unit corrects the degree to which the lubricating oil has been diluted with the fuel based on a temperature of a coolant for the internal combustion engine.

3. A fuel injection control apparatus for a direct injection type internal combustion engine, comprising:

a control unit that estimates an amount of fuel that is vaporized from fuel mixed in lubricating oil used in the internal combustion engine, based on an estimated degree to which the lubricating oil has been diluted with the fuel, and that controls fuel injection based on the amount of fuel vaporized.

4. The fuel injection control apparatus for a direct injection type internal combustion engine according to claim 3, wherein the control unit estimates the amount of fuel vaporized on an assumption that the amount of fuel vaporized and the degree to which the lubricating oil has been diluted with the fuel are proportional to each other.

5. The fuel injection control apparatus for a direct injection type internal combustion engine according to claim 3, wherein the control unit corrects the amount of fuel vaporized based on a temperature of the lubricating oil.

6. The fuel injection control apparatus for a direct injection type internal combustion engine according to claim 5, wherein the control unit corrects the amount of fuel vaporized based on the temperature of the lubricating oil by correcting an amount of change in the amount of fuel vaporized per unit time based on the temperature of the lubricating oil.

7. The fuel injection control apparatus for a direct injection type internal combustion engine according to claim 6, wherein in a case where a vaporization temperature indicates the temperature of the lubricating oil at which vaporization of the dilution-fuel starts and a threshold temperature indicates the temperature of the lubricating oil which is higher than the vaporization temperature, the control unit corrects the vaporization amount on an assumption that a condition (A) where, until the lubricating oil temperature, which starts increasing from the vaporization temperature, reaches the threshold temperature, the amount of change in the amount of fuel vaporized per unit time increases with the increase in the temperature of the lubricating oil, and a condition (B) where, after the temperature of the lubricating oil reaches the threshold temperature, the amount of change in the amount of fuel vaporized per unit time becomes substantially constant, are both satisfied.

8. The fuel injection control apparatus for a direct injection type internal combustion engine according to claim 3, wherein, when both a condition (A) where the estimated degree to which the lubricating oil has been diluted with the fuel is higher than a reference degree, and a condition (B) where a difference between a learned value obtained by air-fuel ratio control when the internal combustion engine is running at low load, and a reference learned value is less than a reference difference are satisfied, the control unit sets an amount of change in the amount of fuel vaporized per unit time to a greater value, than when at least one of the condition (A) and the condition (B) is unsatisfied.

9. The fuel injection control apparatus for a direct injection type internal combustion engine according to claim 3, wherein, when the estimated degree to which the lubricating oil has been diluted with the fuel is higher than a reference degree, and a difference between a learned value obtained by air-fuel ratio control when the internal combustion engine is running at low load, and a reference learned value is less than a reference difference, the control unit reduces the estimated degree to which the lubricating oil has been diluted with the fuel by an amount corresponding to a degree to which the lubricating oil has been diluted with the fuel, which is stored when the direct injection type internal combustion engine is stopped last time.

10. The fuel injection control apparatus for a direct type internal combustion engine according to claim 1, wherein the control unit estimates the degree to which lubricating oil has been diluted with fuel after making a determination that fuel dilution has stopped increasing.

11. A fuel injection control apparatus for a direct injection type internal combustion engine, comprising:

a control unit that estimates an amount of fuel that is vaporized from fuel mixed in lubricating oil used in the internal combustion engine, based on a degree to which the lubricating oil has been diluted with the fuel, which is estimated based on a measured length of time the internal combustion engine has been running, and on one of an accumulated value that indicates an amount of air that has been taken in by the internal combustion engine while the internal combustion engine has been running and an accumulated value that indicates an amount of fuel that has been injected while the internal combustion engine has been running; and that controls fuel injection based on the amount of fuel vaporized.

* * * * *